United States Patent [19]

Grissom

[11] Patent Number: 4,726,650
[45] Date of Patent: Feb. 23, 1988

[54] OPTICAL ACCELEROMETER

[75] Inventor: David Grissom, Houston, Tex.

[73] Assignee: Western Atlas International, Inc., Houston, Tex.

[21] Appl. No.: 780,884

[22] Filed: Sep. 27, 1985

[51] Int. Cl.⁴ .............................................. G02B 6/16
[52] U.S. Cl. .................................. 350/96.29; 356/351
[58] Field of Search ................. 73/800, 847; 356/351; 350/96.15, 96.29, 96.30, 400, 403, 406

[56] References Cited

U.S. PATENT DOCUMENTS

| | | | |
|---|---|---|---|
| 3,800,594 | 4/1974 | Hutchings et al. | 73/516 R |
| 4,320,475 | 3/1982 | LeClerc et al. | 367/149 |
| 4,389,090 | 6/1983 | LeFevre | 350/96.29 |
| 4,530,078 | 7/1985 | Lagakos et al. | 367/149 |
| 4,615,582 | 10/1986 | LeFevre et al. | 350/96.29 |

OTHER PUBLICATIONS

Encyclopedic Dictionary of Exploration Geophysics, 2nd Ed., Robt. E. Sheriff, Society of Exploration Geophysicists.

*Primary Examiner*—Eugene R. LaRoche
*Assistant Examiner*—Steven J. Mottolo
*Attorney, Agent, or Firm*—William A. Knox; Barry C. Kane

[57] ABSTRACT

A loop, formed in a single suspended strand of a photoelastic material, serves as an inertia mass that is rotatable about the axis of the suspended strand. The angular displacement of the loop, due to an accelerating force, is measured as a function of the change in polarization angle of a radiant beam passing through the strand.

9 Claims, 6 Drawing Figures

OPTICAL ACCELEROMETER

BACKGROUND OF THE INVENTION

1. Field of the Invention

This invention teaches a moving-coil, optical-fiber accelerometer for measuring accelerations such as may be due to particle motions of the earth.

2. Discussion of the Prior Art

Optical-fiber sensors for measuring pressure, strain, temperature and other physical quantities are known. Generally such sensors depend upon the fact that the quantity to be measured somehow changes certain optical characteristics of a cladded glass or silica fiber. For example, application of a transient pressure field to a fiber changes the length and/or index of refraction of the fiber as a function of the change in pressure with respect to time. A beam of coherent radiation is launched into a measurement fiber and, in parallel, into a shielded reference fiber. The two emergent beams are recombined, usually interferometrically. The transient pressure field modulates the beams propagating through the measurement fiber to cause a phase shift of the modulated beam relative to the reference beam. The resulting pattern of interference fringes is probed by a photodetector to convert the observed phase shifts to an electrical anlog signal. A typical pressure responsive sensor is disclosed in U.S. Pat. No. 4,320,475 to Le Clerc et al.

An accelerometer can be created by applying a pressure to an optical fiber by means of an inertia mass. The sensitivity of such accelerometers is enhanced by microbending the fiber as between a fixed and a moveable corrugated grid. The output beam is intensity modulated. One such sensor is taught by U.S. Pat. No. 4,530,078 to Logakos et al.

Known optical sensors tend to be somewhat complex and delicate, particularly those that depend upon phase shift modulation. The interferometer/photodetector combination prefers a benign laboratory environment over the harsh conditions in the field.

Optical-fiber systems in general, including seismic sensor systems, suffer from induced polarization effects due to stresses and bends in the fibers. It is necessary to control the state of polarization of the radiation propagating through the system. To that end, polarization controllers are provided. One type of polarization controller is disclosed in U.S. Pat. No. 4,389,090 which is incorporated herein by reference.

Briefly the controller depends upon the photo-elastic effect for its operation. An optical fiber strand is bent into a loop of one or more turns having a relatively small radius. Photoelasticity causes the normally isotropic fiber to become birefringent under stress. Upon rotation of the loop, about an axis in the plane of the loop, the axis of birefringence is rotated, thus producing a change in the state of polarization of the radiation propagating through the polarization controller. In use, the polarization controller is inserted into the optical system under consideration. The optical-fiber loop is rotated to a desired angle and is locked in place for the duration of the progress of the experiment. Usually a two- or three-unit polarization controller is provided so as to control any state of polarization.

SUMMARY OF THE INVENTION

It is the object of this invention to provide a simple, robust, inexpensive optical accelerometer that is simple to construct and to use, the operation of which is based on the phenomenon of photoelasticity.

In accordance with this invention, a strand of optical fiber is coiled into a loop of one or more turns. The opposite ends of the fiber strand are extended tangentially from the loop in the plane containing the loop. The extended ends are secured to rigid supports so that the loop is pivotally suspended about an axis defined by the extended fiber ends. The loop itself, plus an enclosing frame if any, defines a proof mass. In the absence of an accelerating force, the loop maintains a preselected angular position due to the torsion of the extended fiber ends. A beam of electromagnetic radiation is launched into one of the fiber ends. A polarizer and a photodetector are provided to examine the polarization angle of the radiant beam as it emerges from the other fiber end. When subjected to a transient accelerating force, the optical fiber loop, acting as an inertia mass, rotates pivotally about the suspending fiber ends, thereby rotating the plane of polarization of the radiant beam propagating through the fiber, relative to the fixed polarizer. The extinction level, as observed by the photodetector, is a function of the angular rotation of the optical fiber loop due to the transient accelerating force.

In accordance with another aspect of this invention, the optical fiber loop includes a metallic member positioned between the poles of a magnet. Motion of the metallic member in the magnetic field generates eddy currents which tend to damp the oscillatory system.

BRIEF DESCRIPTION OF THE DRAWINGS

A better understanding of the features and advantages of my invention may be obtained from the appended detailed description and the drawings, wherein.

DETAILED DESCRIPTION OF THE PREFERRED EMBODIMENT

The basic principles of a conventional passive polarization controller are described in the U.S. Pat. No. 4,389,090 so that there should be no need to discuss fundamentals here. Rather, I shall discuss the mechanization of a new dynamic use for a known optical component, which will be employed as an accelerometer. In the Figures, like reference numbers are used for like parts.

Figure 1:
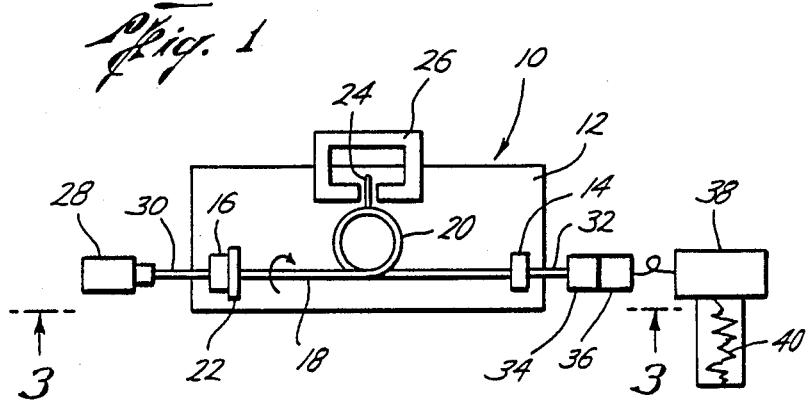
FIG. 1 is a plan view of the accelerometer of this invention.
Figure 2:
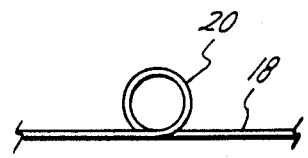
FIG. 2 is a view of a single-turn optical-fiber loop.
Figure 3:
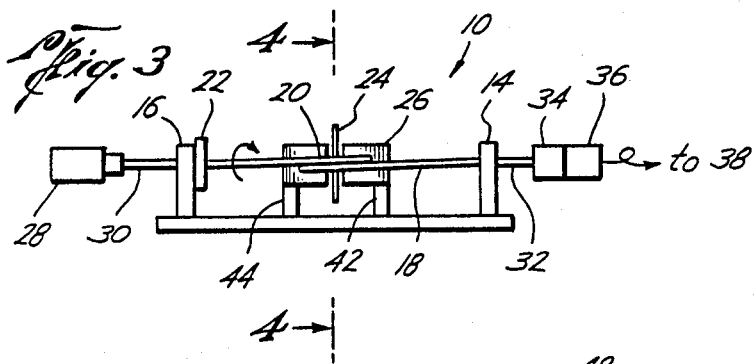
FIG. 3 is a side view of FIG. 1 along 3—3.

FIG. 1 is a plan view of the accelerometer 10 of this invention. It consists of a base 12, at each end of which are mounted supports 14, 16. A monomodal fiber strand 18 is stretched between supports 14 and 16 and securely fixed in place. A loop 20 of one or more turns having a radius of 1 cm or less is formed in optical fiber 18 as shown in FIGS. 1, 2 and 3. If desired, loop 20 may be enclosed in a light-weight frame or spool (not shown) for mechanical stability. The loop extends tangentially from fiber strand 18. The torsion of the optical fiber 18 maintains loop 20 in a desired plane, relative to the gravitational vertical, such as in a horizontal plane as shown. The fiber torsion can be adjusted by torsion adjustment knob 22 which can twist the fiber a limited amount around the horizontal axis. The fiber loop 20 itself acts as a proof mass in a spring/mass seismic system, the mass being pivotal about the axis of the fiber strand 18 acting as a torsion spring.

A light-weight metallic damping plate 24 is secured vertically to the outer end of loop 20. Preferably plate 24 is constructed of copper or aluminum shim stock which may be 0.001 to 0.002 inch thick. The damping plate is floatingly supported between the poles of permanent magnet 26. The damping effect on the moving inertia mass as a function of frequency is produced by eddy currents generated in damping plate 24 when it oscillates in the magnetic field of magnet 26 due to transient acceleration forces.

In operation, a source of coherent radiation such as a He/Ne laser 28 launches a light beam into one end 30 of fiber strand 18 that acts as a radiation input window. The beam emerging from the other end 32 of fiber strand 18, which acts as a radiation output window, is passed into a polarizer 34 of any desired type and thence to a photodetector 36 of conventional design. As loop 20 pivots about the axis of fiber strand 18 under the influence of a transient accelerating force, the angular state of polarization of the emergent radiation beam changes relative to fixed polarizer 34. The change of state of polarization creates a corresponding change in the extinction level of the radiation beam as seen by photodetector 36 after passage of the beam through polarizer 34. Photodetector 36 converts the extinction level into an analog voltage that may be received by an oscillograph 38 to produce a visual time-scale trace 40. Trace 40 represents the amplitude of a transient accelerating force plotted as a function of time. The output signals from photodetector 36 also may be quantized and recorded as digital numbers on magnetic tape if desired.

The moving element, that is optical-fiber loop 20, inherently provides a 5- to 6-dB gain in sensitivity because, if the correct design parameters are chosen, an angular motion of $\theta$ of loop 20 results in a rotation of the extinction angle of nearly $2\theta$.

Figure 4:
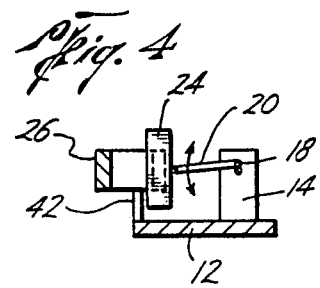
FIG. 4 is a cross section of FIG. 3 along 4—4.

FIGS. 3 and 4 are side and sectional views respectively of the accelerometer of FIG. 1. In addition to the different views, these Figures show means 42 and 44 for supporting magnet 26.

Figure 5:
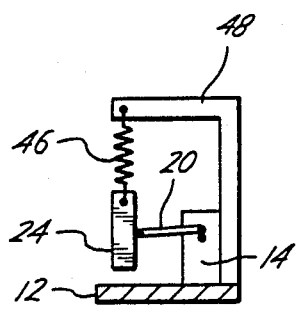
FIG. 5 is an alternate design of the accelerometer of FIG. 1 but employing an auxiliary extension spring.

In the event that the torsion of optical fiber strand is insufficient to support the overhanging pendulous inertia mass represented by fiber loop 20 and damping plate 24 in a desired attitude, an auxiliary extension spring 46, FIG. 5 may be added. Spring 46 is of course, suspended from a suitable support such as 48. The combined spring constants of fiber 18, acting as a torsion spring, and extension spring 46 if used, must be matched with the combined mass of the moving element represented by loop 20 and damping plate 24 to tune the accelerometer 10 to the desired resonant frequency according to well-known mechanical principles. The spring constant of the torsion spring is easily adjusted for tuning purposes by torsion adjustment knob 22. For reflection seismic work, the preferred resonant frequency is on the order of 10-14 Hz. The damping coefficient is usually on the order of 0.6 to 0.7 of critical damping.

Source 28, polarizer 34, photodetector 36 and recorder 38 need not be collocated with accelerometer 10. They may be remotely located by extending end portions 30 and 32 of fiber 18.

Figure 6:
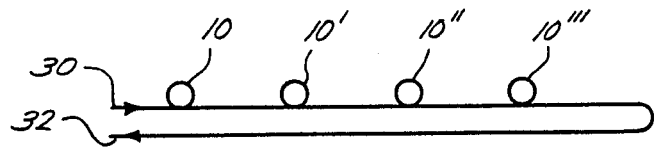
FIG. 6 shows a plurality of accelerometers coupled in cascade.

Several accelerometers 10-10''' may be cascaded in series as an array, as shown in FIG. 6, if desired.

The arrangement in FIGS. 1-5 is suitable for use in detecting vertical accelerations. The axis of fiber strand 18 could equally well be disposed vertically such that accelerometer 10 is sensitive to horizontal motions.

It is contemplated that the active unit may be packaged in a compact cannister of one or two cubic centimeters. The laser source, polarizer and photodetector may be separately packaged or may be incorporated into the package containing the active unit. Conventional power supplies have not been shown since they are not germane to the invention per se. Miniature LEDs and photodiodes are readily available as an aid to miniaturization. The polarizer 34 may be a Polaroid film or, perhaps, a Brewster window either of which is commercially avaiable.

This invention has been described with a certain degree of specificity for purposes of illustrative example. Many modifications and design features will occur to those skilled in the art but which will fall within the scope of this disclosure which is limited only by the appended claims.

I claim as my invention:

1. An optical-fiber accelerometer, comprising:
   a photo-elastic inertia mass having radiation input and output windows;
   means for rotatably suspending said photo-elastic inertia mass about an axis relative to the gravitational vertical;
   means for launching a radiant beam into said input window;
   means for measuring the polarization extinction level of the radiant beam emerging from the output window as a function of the angular displacement of said photo-elastic inertia mass caused by a transient accelerating force.

2. The optical fiber accelerometer as defined by claim 1, further comprising:
   means for damping the angular motion of said photo-elastic inertia mass.

3. The optical fiber accelerometer as defined by claim 2, wherein said meas for rotatably suspending said photo-elastic inertia mass comprises a torsion spring and including means for adjusting the torque thereof.

4. An optical-fiber accelerometer, comprising:
   a loop of at least one turn in a stranded photo-elastic material supported for angular displacement about an axis of revolution under the influence of transient acceleration forces, said loop of photo-elastic material having radiation input and output windows;
   means for damping the angular displacement of said loop as a function of the frequency of the transient acceleration forces;
   means for launching a radiant beam into said input window;
   means for receiving the radiant beam from said output window after passage of said radiant beam through said loop;
   means for measuring, as a function of angular displacement of said loop, a polarization angle of the received radiant beam.

5. The optical-fiber accelerometer as defined by claim 4, comprising:
   a torsion member, said loop being tangentially secured to said torsion member so that said loop forms an overhanging pendulous inertia mass; and means for adjusting said torsion member.

6. The optical-fiber accelerometer as defined by claim 5, wherein said torsion member and said loop are comprised of a single strand of monomodal optical fiber.

7. An optical-fiber accelerometer, comprising:
- a spring/mass seismic system, having a predetermined resonant-frequency range, formed from a single looped strand of monomodal optical fiber having radiation input and output ends;
- means for launching a radiant beam of radiation into said input end;
- means for receiving the radiant beam emerging from the output end;
- means for measuring a transient acceleration force as a function of the polarization extinction angle of the received radiant beam.

8. The optical-fiber accelerometer as defined by claim 7, comprising:
- means for damping said spring/mass seismic system as a function of the transient accelerating force.

9. The optical-fiber accelerometer as defined by claim 8, further comprising:
- means for tuning the resonant frequency of said spring/mass seismic system.